(12) United States Patent
Lookman et al.

(10) Patent No.: US 10,045,409 B2
(45) Date of Patent: Aug. 7, 2018

(54) SUPPLY CIRCUIT FOR A LED CONTROLLER

(71) Applicant: ROHM CO., LTD., Ukyo-ku, Kyoto (JP)

(72) Inventors: Paulo Lookman, Kyoto (JP); Michael Haase, Kyoto (JP); Mats Schmalhorst, Kyoto (JP); Markus Spitz, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 15/592,647

(22) Filed: May 11, 2017

(65) Prior Publication Data

US 2017/0332448 A1 Nov. 16, 2017

(30) Foreign Application Priority Data

May 13, 2016 (EP) ..................................... 16169712

(51) Int. Cl.
*H05B 33/08* (2006.01)
*B60Q 1/14* (2006.01)
*B60Q 1/02* (2006.01)
*F21S 41/141* (2018.01)

(52) U.S. Cl.
CPC ......... *H05B 33/083* (2013.01); *B60Q 1/1415* (2013.01); *H05B 33/0887* (2013.01); *H05B 33/0896* (2013.01); *B60Q 1/02* (2013.01); *F21S 41/141* (2018.01)

(58) Field of Classification Search
None
See application file for complete search history.

(56) References Cited

U.S. PATENT DOCUMENTS 9,578,701 B1 * 2/2017 Logiudice .......... H05B 33/0815
2012/0133289 A1 * 5/2012 Hum ................... H05B 33/083
315/185 R

* cited by examiner

*Primary Examiner* — Jany Richardson
(74) *Attorney, Agent, or Firm* — Cantor Colburn LLP

(57) ABSTRACT

A supply circuit adapted to provide a continuous power supply for a string of serially connected light emitting elements driven with a current source, said supply circuit including: a voltage supply capacitor connected to said string and being adapted to provide a supply voltage for a driving control unit configured to control the light emitting elements of said string; and a capacitor bypass switch connected in parallel with said voltage supply capacitor and being controlled by a local control circuit of said driving control unit, wherein said capacitor bypass switch is switched off by said local control circuit to charge said voltage supply capacitor with a charging current to maintain a continuous power supply without disturbing the current to said string of light emitting elements.

14 Claims, 4 Drawing Sheets

SUPPLY CIRCUIT FOR A LED CONTROLLER

CROSS-REFERENCE TO RELATED APPLICATION

The present invention claims priority under 35 U.S.C. § 119 to European Patent Application No. 16169712.3, filed May 13, 2016, the entire contents of which are incorporated herein by reference.

TECHNICAL FIELD

The present disclosure relates to a supply circuit for providing a continuous power supply for a string of serially connected light emitting elements driven by a current source and controlled by an LED controller.

BACKGROUND

Light emitting arrays can include a matrix of light emitting elements, in particular light emitting diodes LEDs. The light emitting array can include light emitting strings each including a string of serial connected LEDs. For dimming and controlling a light beam provided by the light emitting array, individual light emitting elements can be bypassed by a bypass switch connected in parallel to the respective light emitting element. A bypass switch can be a transistor controlled by a control unit including a matrix LED controller. The matrix controller can also monitor fault conditions of the light emitting diodes. A separate current driver can deliver a supply current for the serial connected light emitting elements.

SUMMARY

The present disclosure provides some embodiments of a continuous power supply without disturbing an electrical current to light emitting elements.

According to a first aspect of the present disclosure provides a supply circuit including the features of claim 1.

The present disclosure provides according to the first aspect a supply circuit adapted to provide a continuous power supply for a string of serially connected light emitting elements driven with a current source, said supply circuit including: a voltage supply capacitor connected to said string and being adapted to provide a supply voltage for a driving control unit configured to control the light emitting elements of said string; and a capacitor bypass switch connected in parallel with said voltage supply capacitor and being controlled by a local control circuit of said driving control unit, wherein said capacitor bypass switch is switched off by said local control circuit to charge said voltage supply capacitor with a charging current to maintain a continuous power supply without disturbing the current to said string of light emitting elements.

In a further possible embodiment of the supply circuit according to the first aspect of the present disclosure, the supply circuit includes a diode connected in series with the voltage supply capacitor wherein said voltage supply capacitor is charged via said diode with a charging current if said capacitor bypass switch is switched off by said local control circuit of said controller.

In a still further possible embodiment of the supply circuit according to the first aspect of the present disclosure, the charging current is generated by a current source connected to said driving control unit.

In a still further possible embodiment of the supply circuit according to the first aspect of the present disclosure, the local control circuit includes a sense circuitry adapted to measure a voltage at the voltage supply capacitor.

In a still further possible embodiment of the supply circuit according to the first aspect of the present disclosure, if during operation of said string of light emitting elements the voltage of said voltage supply capacitor measured by a sense circuitry of said local control circuit drops under a predetermined low threshold voltage, the capacitor bypass switch is switched off by the local control circuit to charge said voltage supply capacitor.

In a still further possible embodiment of the supply circuit according to the first aspect of the present disclosure, during operation of said string of light emitting elements, the capacitor bypass switch is switched off periodically by the local control circuit to prevent that the voltage of said voltage supply capacitor drops under a predetermined low threshold voltage.

In a further possible embodiment of the supply circuit according to the first aspect of the present disclosure, during a start-up phase of said driving control unit, a pull-down bypass switch being connected in parallel with said string of light emitting elements is turned on to bypass all light emitting elements of said string.

In a still further possible embodiment of the supply circuit according to the first aspect of the present disclosure, during the start-up phase of said driving control unit, the capacitor bypass switch is switched off by the local control circuit to charge the voltage supply capacitor until the voltage of said voltage supply capacitor has reached a predetermined high threshold voltage.

In a possible embodiment of the supply circuit according to the first aspect of the present disclosure, the voltage supply capacitor includes a capacity of more than 1 µF.

In a further possible embodiment of the supply circuit according to the first aspect of the present disclosure, a bypass switch is connected in parallel to each light emitting element of said string of light emitting elements supplied by said supply circuit.

In a further possible embodiment of the supply circuit according to the first aspect of the present disclosure, the driving control unit includes a controller adapted to control the switching of said bypass switches connected in parallel to each light emitting element of said string of light emitting elements supplied by said supply circuit.

In a still further possible embodiment of the supply circuit according to the first aspect of the present disclosure, the switching of said capacitor bypass switch controlled by said local control circuit and the switching of the bypass switches of the light emitting elements controlled by said driving control unit are synchronized by a synchronization unit of said driving control unit.

The present disclosure further provides according to a second aspect a light emitting apparatus including the features of claim 13.

The present disclosure provides according to the second aspect a light emitting apparatus including at least one string of light emitting elements and a supply circuit according to the first aspect of the present disclosure adapted to provide a continuous power supply of said string of light emitting elements.

In a possible embodiment the light emitting apparatus includes light emitting elements formed by light emitting diodes LEDs and/or OLEDs.

BRIEF DESCRIPTION OF THE DRAWINGS

In the following, possible embodiments of the different aspects of the present disclosure are described in more detail with reference to the enclosed figures.

DETAILED DESCRIPTION

Figure 1:
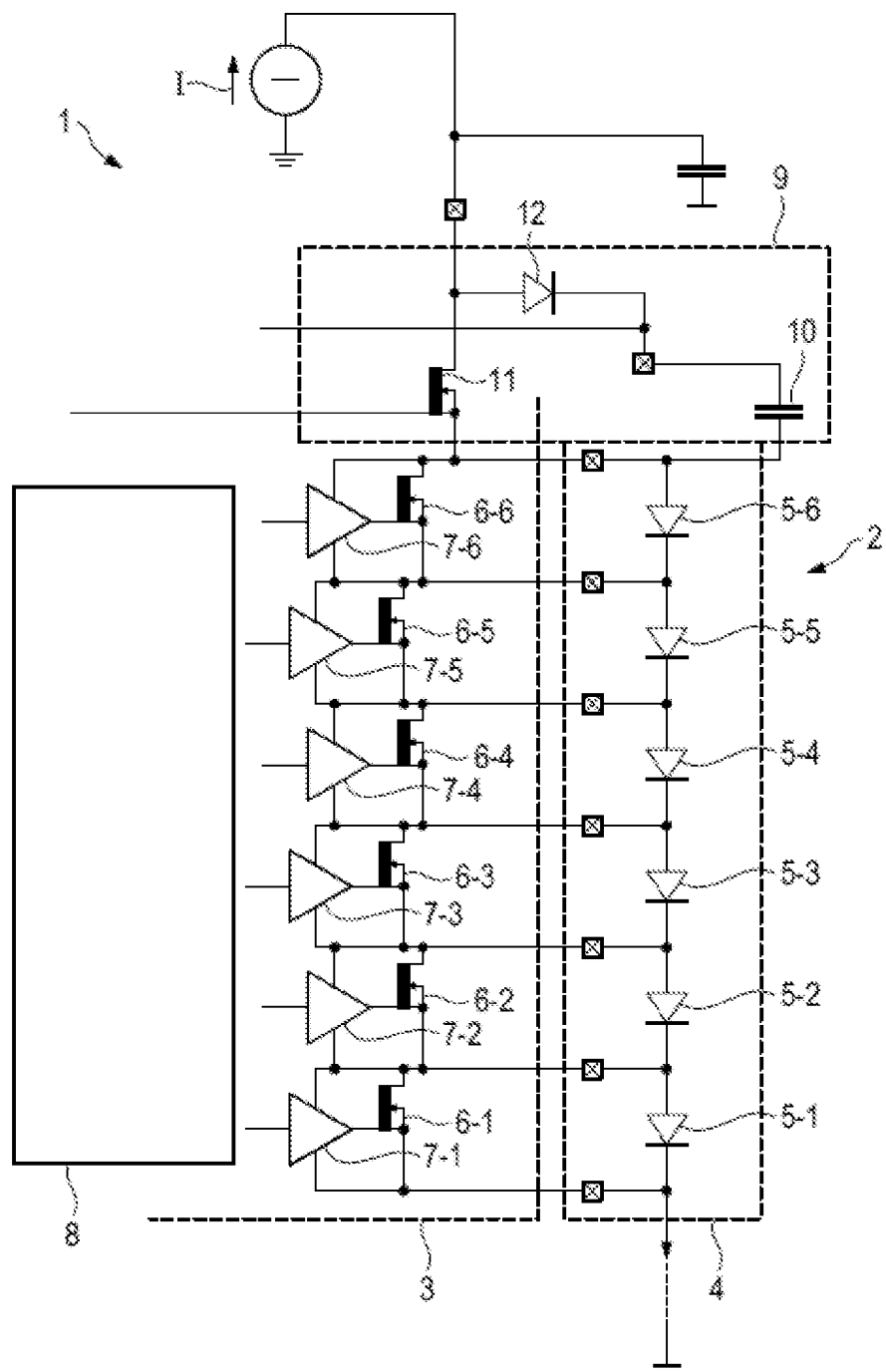
FIG. 1 illustrates a possible exemplary embodiment of a supply circuit according to the first aspect of the present disclosure.

As can be seen in FIG. 1, a light emitting system 1 includes in the illustrated exemplary embodiment a light emitting array 2 controlled by a driving control unit 3. In the illustrated embodiment, the light emitting array 2 includes a light emitting string 4 of serial connected light emitting elements 5. In a possible embodiment, the light emitting array 2 can include several light emitting strings 4 connected in parallel to each other. In the illustrated embodiment, the light emitting string 4 includes six serial connected light emitting elements 5 driven by the driving control unit 3. As shown in FIG. 1, a bypass switch 6-i is connected in parallel to each light emitting element 5-i of the light emitting string 4. In the illustrated embodiment, the bypass switches 6 are formed by MOSFETs. Each bypass switch 6 receives a PWM control signal via a driver formed by an inverter integrated in said driving control unit 3. The driving control unit 3 can include an integrated digital controller 8 forming the core of the driving control unit 3. The controller 8 can include control logic circuits adapted to generate PWM control signals for each channel, i.e., for each light emitting element 5-i of the light emitting array 2. For each light emitting element 5-i, a control logic can be provided adapted to generate a PWM control signal for the associated bypass switch 6 connected in parallel to the respective light emitting element 5.

As illustrated in FIG. 1, a supply circuit 9 provides a continuous power supply for the string 4 of serially connected light emitting elements 5 driven by a current source. The supply circuit 9 includes a voltage supply capacitor 10 connected to the light emitting string 4 of light emitting elements 5. The voltage supply capacitor 10 connected to the string 4 is adapted to provide a supply voltage for the driving control unit 3, and in particular a supply voltage for the digital controller 8 configured to control the light emitting elements 5 of said string 4. The supply circuit 9 further includes a capacitor bypass switch (CB-SW) 11 connected in parallel with the voltage supply capacitor 10 as illustrated in FIG. 1. The capacitor bypass switch 11 can be formed by a MOSFET as shown in FIG. 1. The capacitor bypass switch 11 is controlled by a local control circuit 13 of the driving control unit 3 which can be integrated in a possible exemplary embodiment in the controller 8 of the driving control unit 3. The capacitor bypass switch 11 can be switched off by the local control circuit 13 to charge the voltage supply capacitor 10 with a charging current to maintain a continuous power supply without disturbing the electrical current flowing to the string 4 of light emitting elements 5.

In a possible embodiment, the supply circuit 9 can also include a diode 12 connected to the voltage supply capacitor 10. The voltage supply capacitor 10 can be charged via the diode 12 with the charging current if the capacitor bypass switch 11 is switched off by the local control circuit 13 of the control unit 3. The charging current is generated by a current source connected to the driving control unit 3. As can be seen in FIG. 1, the circuit to drive the bypass switch 11 is supplied from the voltage supply capacitor 10 of the supply circuit 9. The voltage supply capacitor 10 of the supply circuit 9 can be switched in series with the light emitting elements 5 so that no extra external supply is needed and the LED current is not interrupted.

Figure 2:
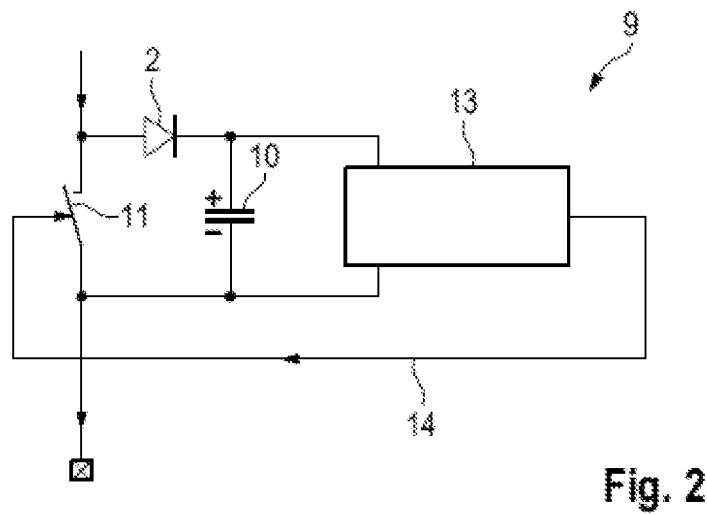
FIG. 2 illustrates a possible exemplary embodiment of a supply circuit according to the first aspect of the present disclosure.

FIG. 2 shows schematically a possible exemplary embodiment of the supply circuit 9 according to the first aspect of the present disclosure adapted to provide a continuous power supply for a string 4 of serially connected light emitting elements 5 driven by a current source 15. As can be seen in FIG. 2, a local control circuit 13 is adapted to control the capacitor bypass switch 11 of the supply circuit 9 via a control signal line 14. The capacitor bypass switch 11 can be formed by a transistor or MOSFET, as illustrated in FIG. 1, or by another kind of switch, in particular an electromechanical switch or relay. The voltage supply capacitor 10 is charged via the diode 12 with a charging current if the capacitor bypass switch 11 is switched off by the local control circuit 13 by applying a corresponding switch control signal via the control signal line 14. The local control circuit 13 of the supply circuit 9 forms part of the driving control unit 3 and can be integrated in a possible embodiment in the LED controller 8 of said driving control unit 3. The supply voltage of the voltage supply capacitor 10 can also be used to operate the LED matrix controller 8. The current to the LED elements 5-i is not disturbed so that there is no effect on the emitted output light when the local power supply is provided.

In a possible embodiment, the local control circuit 13 can include a sense circuitry adapted to measure a voltage at the voltage supply capacitor 10. If during operation of the string 4 of light emitting elements 5 the voltage of the voltage supply capacitor 10 measured by the sense circuitry of the local control circuit 13 drops under a predetermined low threshold voltage, the capacitor bypass switch 11 is automatically switched off by the local control circuit 13 to charge the voltage supply capacitor 10. In a possible embodiment, the capacitor bypass switch 11 is switched off periodically by the local control circuit 13 during operation of the string 4 of light emitting elements 5 to prevent that the voltage of said voltage supply capacitor 10 drops under a predetermined low threshold voltage.

In a possible embodiment, a pull-down bypass switch being connected in parallel with the string 4 of light emitting elements 5 is turned on during a start-up phase of the system 1 to bypass all light emitting elements 5 of the string 4. At the start-up phase of the channels, the pull-down switch bypasses all light emitting elements 5 and pulls down the terminal CH6 of the illustrated driving control unit 3 to ground GND as shown in FIG. 1. During the start-up phase of the system, the capacitor bypass switch 11 is switched off by the local control circuit 13 to charge the voltage supply capacitor 10 until the voltage of the voltage supply capacitor 10 has reached a predetermined high threshold voltage. In a possible embodiment, the switching of the capacitor bypass switch 11 controlled by the local control circuit 13 and the switching of the bypass switches 6 of the light emitting elements 5 controlled by the driving control unit 3 are synchronized by a synchronization unit of the driving control unit 3.

Figure 3:
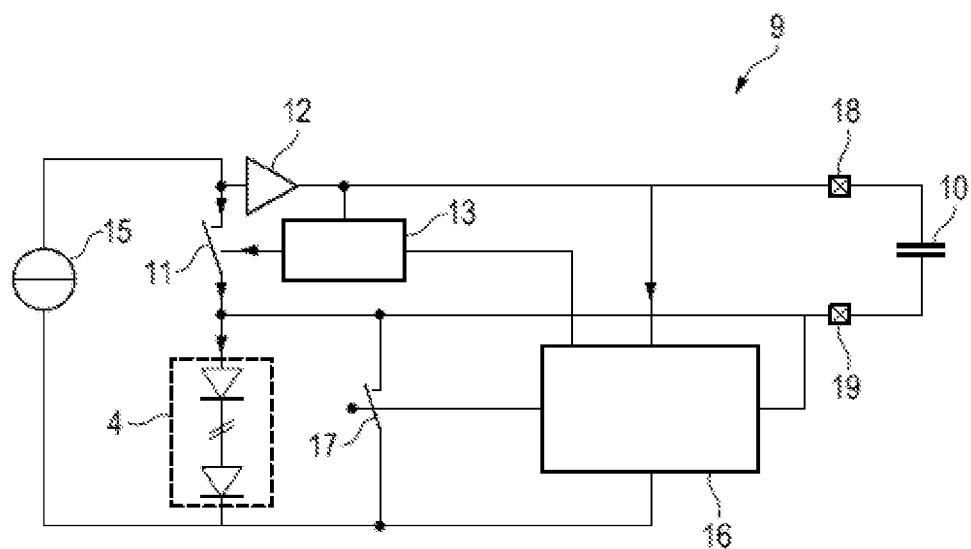
FIG. 3 shows a circuit diagram of a possible exemplary embodiment of a supply circuit according to the first aspect of the present disclosure.

FIG. 3 shows a circuit diagram of a possible exemplary embodiment of a supply circuit 9 according to the first aspect of the present disclosure. The supply circuit 9 including the voltage supply capacitor 10 and the capacitor bypass switch (CB-SW) 11 controlled by the local control circuit 13 provides a continuous power supply for the string 4 of serially connected light emitting elements 5 as illustrated in FIG. 3. As can be seen in FIG. 3, the diode 12 connected in series with the voltage supply capacitor 10 is connected to a current source 15 generating a charging current and a current through the LED string 4. The voltage supply capacitor 10 of the supply circuit 9 is charged via the diode 12 with the string current if the capacitor bypass switch 11 is switched off by the local control circuit 13. The local control circuit 13 receives its power supply by a power supply circuit 16 of the driving control unit 3 which can be integrated in the LED controller 8 of the driving control unit 3. The controller 8 can also control a pull-down bypass switch 17 connected in parallel to the string 4 of light emitting elements 5. In a possible embodiment, during a start-up phase of the controller 8, the pull-down bypass switch 17 is turned on to bypass all light emitting elements 5 of the light emitting string 4. At start-up, the capacitor bypass switch 11 is switched off so that the voltage supply capacitor 10 can be charged with a charging current. The voltage of the voltage supply capacitor 10 can also serve as a supply voltage for the local control circuit 13 as illustrated in FIG. 3. When the voltage supply capacitor 10 has been charged to a target value, a voltage threshold of, e.g., 12 V, the capacitor bypass switch 11 can be activated by the local control circuit 13. For this purpose, the local control circuit 13 can include a sense circuitry adapted to measure the voltage at the voltage supply capacitor 10. During the start-up phase, the capacitor bypass switch 11 is switched off by the local control circuit 13 such that the voltage supply capacitor 10 is charged until the voltage of the voltage supply capacitor 10 has reached the predetermined high threshold voltage or target value of, e.g., 12 V. In a possible implementation, the voltage supply capacitor 10 includes a capacity of more than 1 µF. During the start-up phase, all light emitting elements 5 are bypassed and the voltage supply capacitor 10 is charged until it reaches the predetermined high threshold voltage. As soon as the voltage supply capacitor 10 has reached the target value, the capacitor bypass switch 11 is switched on and the pull-down bypass switch 17 is switched off, starting the operation of the light emitting string 4. FIG. 3 illustrates a first current path. If the capacitor bypass switch 11 is on, the supply current flows through the switch 11 and through the LEDs. If the switch 11 is off, the supply current flows through the diode 12, capacitor 10 and through the LEDs illustrated as a second current path in FIG. 3.

When during the normal operation of the string 4 of light emitting elements 5 the voltage of the voltage supply capacitor 10 measured by the sense circuitry of the local control circuit 13 drops under a predetermined low threshold voltage of, e.g., 6 V, the capacitor bypass switch 11 is switched off by the local control circuit 13 automatically to charge the voltage supply capacitor 10 again with the current provided by the current source 15 which is still flowing through the string 4 of light emitting elements 5. In a possible embodiment, during normal operation of the string 4 of light emitting elements 5, the capacitor bypass switch 10 is switched off periodically by the local control circuit 13 to prevent that the voltage of the voltage supply capacitor 10 drops under the predetermined low threshold voltage of, e.g., 6 V. Then, the capacitor bypass switch 11 is activated to switch through a current $I_{LED}$ provided by the current source 15 and supplied to the string 4 of light emitting elements 5. As a result, the voltage supply capacitor 10 can be charged up without disturbing the operation of the light emitting string 4 of the light emitting array 2.

Figure 4:
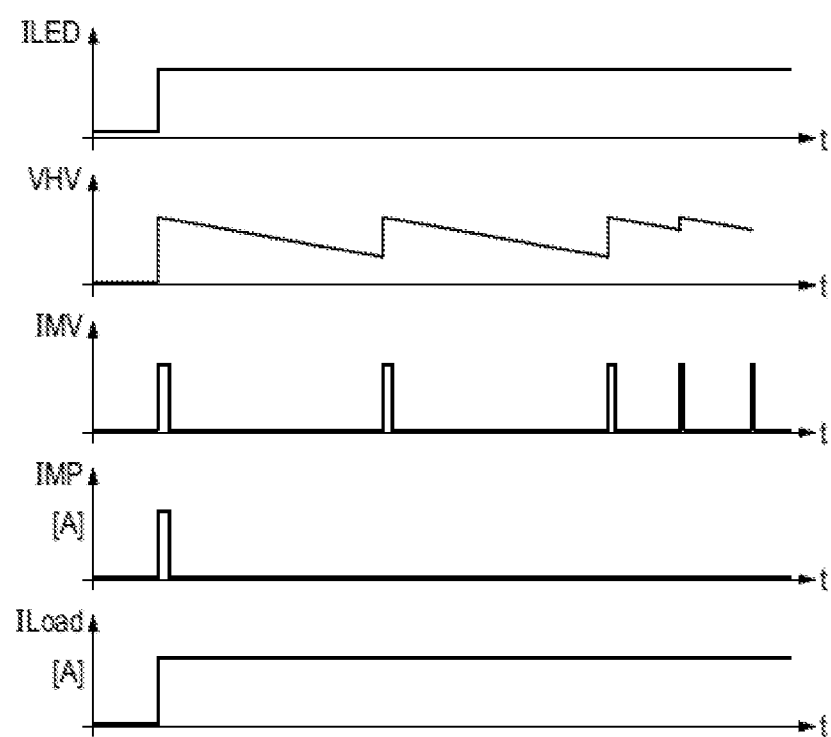
FIG. 4 shows signal diagrams for illustrating the operation of a supply circuit according to the first aspect of the present disclosure as shown in FIG. 3.

FIG. 4 illustrates the operation of the supply circuit 9 shown in FIG. 3. The current source 15 provides a continuous current $I_{LED}$ over time. The voltage supply capacitor 10 includes a voltage $V_{HV}$ which increases during charging of the voltage supply capacitor 10 and which is reduced during discharging of the voltage supply capacitor 10. During charging of the voltage supply capacitor 10, a current $I_{HV}$ generated by the current source 15 flows through the diode 12. In the start-up phase, the auxiliary switch (pull-down bypass switch) 17 is closed and a current flows through the auxiliary switch 17 as illustrated in FIG. 4. If the voltage of the voltage supply capacitor 10 drops under a predetermined low threshold voltage $V_{CHVmin}$, the capacitor bypass switch 11 is switched off by the local control circuit 13 to charge the voltage supply capacitor 10 as illustrated in FIG. 4. If the voltage supply capacitor 10 has reached a predetermined maximum threshold $V_{CHVmax}$, the capacitor bypass switch 11 is closed by the local control circuit 13 as shown in FIG. 4. Accordingly, a soft triggering of the capacitor bypass switch 11 can be performed depending on the voltage drop measured by the sense circuitry of the local control circuit 13. Further, during operation of the string 4 of light emitting elements 5, the capacitor bypass switch 11 can be switched off periodically by the local control circuit 13 to prevent that the voltage of the voltage supply capacitor 10 can reach the low threshold voltage as illustrated in FIG. 4. A voltage step may be generated when the capacitor bypass switch 11 is released, i.e., switched off, to activate the charging of the voltage supply capacitor 10. By synchronizing the moment of charging, the voltage supply capacitor 10 with the PWM switching of the LED bypass switches 6-$i$ can reduce a voltage step of the output voltage of the current supply. The voltage of the capacitor bypass switch 11 can be used to supply the LED controller 8 of the driving control unit 3 during normal operation of the light emitting array 2. As can be seen in FIG. 4, the load current $I_{LOAD}$ flowing through the light emitting string 4 does not include any detectable changes, i.e., is constant over time. Accordingly, the current flowing through the string 4 of light emitting elements 5 is not disturbed during operation of the system. The supply circuit 9 according to the first aspect of the present disclosure provides a serial current charge pump for the matrix LED controller 8 of the driving control unit 3.

Figure 5:
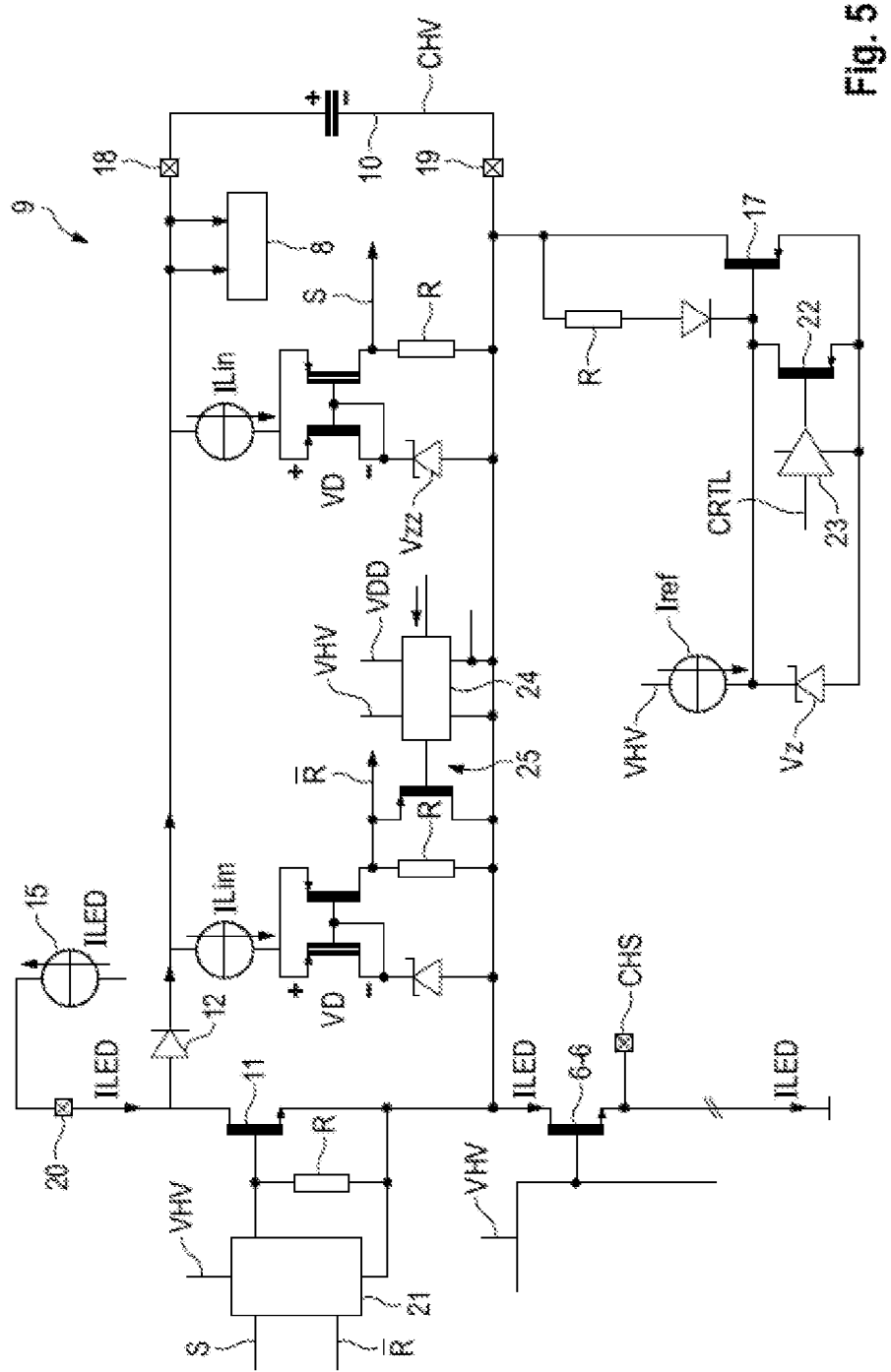
FIG. 5 shows a circuit diagram of a possible exemplary implementation of a supply circuit according to the first aspect of the present disclosure.

FIG. 5 shows an exemplary implementation of a supply circuit 9 according to the first aspect of the present disclosure including a local control circuit 13 connected via pins 18 and 19 to an external voltage supply capacitor 10. An external current source 15 provides the control unit 3 with a current $I_{ELED}$ via a pin 20. When the capacitor bypass switch 11 is open, i.e., non-conducting, the received current is supplied via the diode 12 to charge the voltage supply capacitor 10. If the capacitor bypass switch 11 is conducting, i.e., switched on, no current flows through the diode 12 to charge the capacitor 10. In the illustrated implementation of FIG. 5, the capacitor bypass switch 11 is formed by a MOSFET including a gate terminal connected to the output Q of a flip-flop 21 including a set input S and a reset input R. In response to a set control signal, the output Q of the flip-flop becomes logically high, turning on the MOSFET 11. If the reset input R̂ is logically low, the output Q of the flip-flop becomes logically low, turning off the capacitor bypass switch 11. The set and reset input of the flip-flop 21 are controlled by a sense circuitry of the local control circuit 13 as illustrated in the embodiment of FIG. 5.

In the illustrated implementation of FIG. 5, the pull-down bypass switch 17 includes also a MOSFET connected to the pin 19. The pull-down bypass switch 17 can be disabled in response to a disable control signal by means of a further MOSFET 22 having a gate connected to a driver 23 receiving a disable control signal. The pull-down bypass switch 17 can be activated when the apparatus detects that the voltage drops under a predetermined threshold value.

The sense circuitry of the local control circuit 13 includes in the illustrated embodiment two comparators comparing the voltage of the voltage supply capacitor 10 with a high reference voltage forming a high threshold voltage and with a low reference voltage forming a low reference voltage. The reference voltages are generated by means of Zener diodes providing reference voltages of, e.g., 5.1 V as a low threshold and a voltage of, e.g., 10.2 V as a high threshold. If the high threshold voltage is reached, a set control signal is generated by the sense circuitry and applied to the set input of the flip-flop 21, setting its data output Q to high and thereby turning on the capacitor bypass switch 11 so that the charging of the voltage supply capacitor 10 is stopped.

If, in contrast, the voltage drops beneath a low reference voltage or a MOSFET 25 is activated by a level shift circuit 24 in response to a trigger signal, a reset R̂ signal resets the flip-flop 21 and the capacitor bypass switch 11 is deactivated, i.e., switched off, to initiate the charging of the voltage supply capacitor 10. The trigger signal applied to the level shift circuit 24 can be generated by a control logic of the digital core of the driving control unit 3. The triggering signal can include a safety triggering control signal and/or a periodic triggering control signal applied to the level shift circuit 24 of the logic control circuit 13 integrated in the driving control unit 3. In a safety mode, the pull-down switch 17 is activated and the voltage supply capacitor 10 is charged until the voltage across the voltage supply capacitor 10 reaches a predetermined high threshold level. The charging of the voltage supply capacitor 10 is performed when the voltage drop at the voltage supply capacitor 10 drops below a predetermined low threshold level. This forms a safety mechanism. It is possible to deactivate the pull-down function by controlling the MOSFET 22.

The internal trigger signal applied to the level shift circuit 24 can be synchronized with a PWM counter signal provided to control the bypass switches of the light emitting elements 5. The PWM counter signal can be generated by a PWM block counter generating in a possible implementation a 10-bit counter value. In a possible implementation, the driving control unit 3 includes for each light emitting element 5 a control logic adapted to generate a PWM control signal for the associated bypass switch 6 of the light emitting element 5. The trigger signal can be synchronized to this PWM control signal.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A supply circuit adapted to provide a continuous power supply for a string of serially connected light emitting elements driven with a current source, said supply circuit comprising:
   a voltage supply capacitor connected to said string and being adapted to provide a supply voltage for a driving control unit configured to control the light emitting elements of said string; and
   a capacitor bypass switch connected in parallel with said voltage supply capacitor and being controlled by a local control circuit of said driving control unit,
   wherein said capacitor bypass switch is switched off by said local control circuit to charge said voltage supply capacitor with a charging current to maintain the continuous power supply without disturbing the current to said string of light emitting elements, and
   wherein said local control circuit is configured to measure a voltage at the voltage supply capacitor.

2. The supply circuit according to claim 1, further comprising a diode connected in series with said voltage supply capacitor, wherein said voltage supply capacitor is charged via said diode with the charging current if said capacitor bypass switch is switched off by said local control circuit of said driving control unit.

3. The supply circuit according to claim 1, wherein said charging current is generated by the current source connected to said driving control unit.

4. The supply circuit according to claim 1, wherein if during operation of said string of light emitting elements the voltage of said voltage supply capacitor measured by said local control circuit drops under a predetermined low threshold voltage, the capacitor bypass switch is switched off by the local control circuit to charge said voltage supply capacitor.

5. The supply circuit according to claim 1, wherein said voltage supply capacitor comprises a capacity of more than 1 µF.

6. The supply circuit according to claim 1, wherein one or more bypass switches are connected, in parallel, respectively to light emitting elements of said string of light emitting elements supplied by said supply circuit.

7. The supply circuit according to claim 6, wherein the driving control unit comprises a controller adapted to control the switching of said bypass switches.

8. The supply circuit according to claim 7, wherein the switching of said capacitor bypass switch controlled by said local control circuit and the switching of the bypass switches of the light emitting elements controlled by said driving control unit are synchronized by a synchronization unit of said driving control unit.

9. A light emitting apparatus comprising at least one string of light emitting elements and the supply circuit according to claim 1 adapted to provide the continuous power supply for said string of light emitting elements.

10. The light emitting apparatus according to claim 9, wherein the light emitting elements comprise one or both of light emitting diodes (LEDs) and organic light emitting diodes (OLEDs).

11. A head light system for a vehicle comprising the light emitting apparatus according to claim 9.

12. A supply circuit adapted to provide a continuous power supply for a string of serially connected light emitting elements driven with a current source, said supply circuit comprising:
- a voltage supply capacitor connected to said string and being adapted to provide a supply voltage for a driving control unit configured to control the light emitting elements of said string; and
- a capacitor bypass switch connected in parallel with said voltage supply capacitor and being controlled by a local control circuit of said driving control unit,
- wherein said capacitor bypass switch is switched off by said local control circuit to charge said voltage supply capacitor with a charging current to maintain the continuous power supply without disturbing the current to said string of light emitting elements, and
- wherein during operation of said string of light emitting elements, the capacitor bypass switch is switched off periodically by the local control circuit to prevent that the voltage of said voltage supply capacitor drops under a predetermined low threshold voltage.

13. A supply circuit adapted to provide a continuous power supply for a string of serially connected light emitting elements driven with a current source, said supply circuit comprising:
- a voltage supply capacitor connected to said string and being adapted to provide a supply voltage for a driving control unit configured to control the light emitting elements of said string; and
- a capacitor bypass switch connected in parallel with said voltage supply capacitor and being controlled by a local control circuit of said driving control unit,
- wherein said capacitor bypass switch is switched off by said local control circuit to charge said voltage supply capacitor with a charging current to maintain the continuous power supply without disturbing the current to said string of light emitting elements, and
- wherein during a start-up phase of said driving control unit, a pull-down bypass switch being connected in parallel with said string of the light emitting elements is turned on to bypass all light emitting elements of said string.

14. The supply circuit according to claim 13, wherein during the start-up phase of said driving control unit, the capacitor bypass switch is switched off by the local control circuit to charge the voltage supply capacitor until the voltage of said voltage supply capacitor has reached a predetermined high threshold voltage.

\* \* \* \* \*